(12) United States Patent
Ecob et al.

(10) Patent No.: US 7,178,151 B2
(45) Date of Patent: Feb. 13, 2007

(54) PERIPHERAL DRIVER FORWARD COMPATIBILITY

(75) Inventors: Stephen Edward Ecob, Bexley (AU); Alexander Vincent Danilo, Killarney Heights (AU)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 09/988,446

(22) Filed: Nov. 20, 2001

(65) Prior Publication Data

US 2002/0062404 A1    May 23, 2002

(30) Foreign Application Priority Data

Nov. 22, 2000  (AU)  ................................ PR1618

(51) Int. Cl.
*G06F 9/46* (2006.01)
(52) U.S. Cl. .................................... 719/327
(58) Field of Classification Search ................ 719/322, 719/310, 319, 321, 327
See application file for complete search history.

(56) References Cited

U.S. PATENT DOCUMENTS

| | | | | |
|---|---|---|---|---|
| 5,566,278 A | * | 10/1996 | Patel et al. ................. | 358/1.15 |
| 5,668,996 A | * | 9/1997 | Radinsky ..................... | 719/322 |
| 5,982,996 A | * | 11/1999 | Snyders ...................... | 358/1.15 |
| 6,067,406 A | * | 5/2000 | Van Hoof et al. ........... | 358/1.9 |
| 6,515,756 B1 | * | 2/2003 | Mastie et al. .............. | 358/1.15 |
| 6,684,260 B1 | * | 1/2004 | Foster et al. ................ | 719/327 |
| 2002/0082089 A1 | | 6/2002 | Kobayashi et al. ........... | 463/43 |

FOREIGN PATENT DOCUMENTS

| | | |
|---|---|---|
| JP | 8-123630 | 5/1996 |
| JP | 8-292853 | 11/1996 |
| JP | 11-91206 | 4/1999 |
| JP | 11-219268 | 8/1999 |
| JP | 2002-78957 | 3/2002 |

* cited by examiner

*Primary Examiner*—William Thomson
*Assistant Examiner*—LeChi Truong
(74) *Attorney, Agent, or Firm*—Fitzpatrick, Cella, Harper & Scinto

(57) ABSTRACT

A method (200) for generating a device driver in an information processing apparatus (101) for a device connected thereto, such as a printer (115), is disclosed. The method (100) obtains a Printer Characterization File (PCF) which contains a characterization of the device (115) or a group of devices. The device driver is then generated by using the PCF to configure a Device Model Independent Printer Driver (DMIPD) stored with an application on an unchangeable memory, such as a CD-ROM.

20 Claims, 4 Drawing Sheets

| FIELD TYPE | FIELD NAME |
|---|---|
| Array of strings | Model Names |
| Integer | Number of Colour Components |
| 3D Array of characters | Colour conversion map for component 1 |
| 3D Array of characters | Colour conversion map for component 2 |
| ... | ... |
| 3D Array of characters | Colour conversion map for component N |
| String | Start of page control sequence |
| String | End of page control sequence |
| String | Begin scanline of component 1 control sequence |
| String | Begin scanline of component 2 control sequence |
| ... | ... |
| String | Begin scanline of component N control sequence |
| String | End of scanline control sequence |

Fig. 2

```
/* pointers to fixed data */
const char   *ModelName = "BJ-F000";
const int    ColourComponents = 6;
...

printf("Printer model is %s\n", ModelName);
...
```

Fig. 4 (Prior art)

```
/* pointer to loadable data */
struct Pcf  *PcfPointer = malloc(sizeof(struct Pcf));

fread(PcfPointer, sizeof(struct Pcf), 1, PcfFile);

printf("Printer model is %s\n", PcfPointer->ModelName);
...
```

Fig. 5

PERIPHERAL DRIVER FORWARD COMPATIBILITY

TECHNICAL FIELD OF THE INVENTION

The present invention relates generally to interfacing peripheral devices to video game consoles and, in particular, to managing forward compatibility of peripheral driver software with updated peripheral hardware,

BACKGROUND ART

The interfacing of peripherals to personal computers (PCs) is a mature art that has well-established methods for dealing with forward compatibility. In the PC industry, a number of manufacturers provide peripherals that are compatible and interchangeable to a high degree. This is possible through the use of open interface standards, and through the mediating role of Operating Systems used with PCs.

The Operating System (OS) of a PC defines a Device Driver Interface (DDI) for a given class of peripheral. This enables the OS to access a number of peripherals of that class in a consistent and device independent manner. This is possible because the Device Driver (driver) for each peripheral encompasses the functionality of that peripheral and presents it to the OS in accordance with the DDI, so that all peripherals of that class can be interfaced to in essentially the same way.

The OS also provides an Application Program Interface (API) for application programs. This API encompasses the functionality of the PC (including its peripherals) and presents it to the application programs (applications) as a device independent interface. Hence, the applications are able to run on a PC without regard to what particular configuration of different peripherals is connected to that PC.

The OS mediates between application programs and peripherals. When a new peripheral is added to a PC, a new device driver for that peripheral is installed on a storage device of the PC. Applications executing on the PC are able to use the new peripheral, through its driver. Because the applications access the peripheral through its S driver, they are isolated from the need for any change in their own functionality. The modular nature of PC software thus makes it easy to provide forward compatibility with new peripherals.

One alternate approach that has been adopted for use on PCs is that used by Adobe® for their Postscript® printer driver for PCs (Adobe and PostScript are trade marks registered in Australia in the name of Adobe Systems Incorporated). This driver provides forward compatibility with updated printer hardware without the replacement of the driver itself. This is achieved by providing a printer model specific configuration file (called a PPD) file) for each printer model. When printing, the PostScript printer driver reads the PPD file of the printer that it is printing to, and modifies the data that it sends to the printer by including model specific print commands from the PPD file. These model specific print commands provide support for the new features of the updated hardware.

This solution for PostScript printers is possible because PostScript printers implement the PostScript page description language, which is in fact a full programming language. PostScript print jobs are in fact PostScript programs. This allows the PostScript driver to delegate model specific data processing to the printer itself, by transferring PostScript program code from the PPD file to the printer.

The PostScript printer driver for PCs provides forward compatibility with updated printer hardware without the need to replace the printer driver. This is possible because the updated printer itself executes the program code required for its new features, so the program code of the printer driver does not need to change. This solution would not work for peripherals that are incapable of executing program code that is downloaded to them.

The interfacing of peripherals to game consoles is a relatively undeveloped art, which has previously had little need to address the issue of forward compatibility. The interfacing of peripherals to video game consoles is a very different matter to interfacing with PCs described above. Software for video game consoles is inherently of a monolithic and unchangeable nature, as opposed to the modular and upgradeable nature of PC software. This is caused by the very different natures of the two platforms.

PCs have large hard disk memories that allow a multitude of software modules (including applications, drivers, libraries and others) to be installed concurrently PC operating systems impose standardised interfaces on software modules, which allows interchangeability. As modules become obsolete, they can easily be replaced, without the need to replace other modules. Replacement can occur by installing the new module from a floppy disk, a CD, or downloading it from the Internet.

Game consoles typically have no hard disk memory, instead providing a CD-ROM/DVD-ROM drive or ROM cartridge slot that allows the console to run only one game application at a time. The game applications are monolithic in that all code and data is stored together in unchangeable media such as mask ROM modules, CDs or DVDs. Because the game applications are stored on unchangeable media, it is not possible to update them in order to provide compatibility with new hardware. Each game application operates in complete isolation, with no linkage to other software. No provision has been made for upgrading game applications with updated software modules, short of total replacement. The game console may provide some small amount of non-volatile memory, but this is typically intended only for the storage of configuration and high score data. It is generally not possible to modify game applications by linking them to executable code stored in this non-volatile memory The inflexibility of the game console environment has previously not been of great concern. The design of game console hardware has traditionally been "set in stone" for the lifetime of each specific platform. This removed the need for game applications to cope with updated hardware.

Given the current trend for the convergence of technologies, it is not surprising that the distinction and differences between PCs and game consoles are reducing. Game consoles now offer general-purpose hardware expansion busses, such as USB, which raises the prospect of interfacing PC peripherals to game consoles. The provision of hardware compatibility alone is not sufficient, as software compatibility is also required.

One solution for providing software compatibility is to equip the game console with a PC style operating system. The solution then becomes the same as for the PC. This approach has not met with much success, and the game console industry is generally avoiding it. Several reasons for this have been suggested, which include:

Many game developers are unwilling to make the sacrifice in performance that comes with conforming to OS interfaces;

Some operating systems provide interfaces that are awkward and cumbersome to use; and Some operating systems require the game console manufacturer to pay a licensing fee.

As game console hardware approaches that of the PC, but in the absence of a PC style OS, the presently addressed issue becomes a problem. The USB interface allows game consoles to connect to a myriad of new peripherals, but there is no method for game applications to provide forward compatibility with peripherals released after the game.

SUMMARY OF THE INVENTION

It is an object of the present invention to substantially overcome, or at least ameliorate, one or more disadvantages of existing arrangements.

According to a first aspect of the invention, there is provided a method for generating a device driver for a device in an information processing apparatus that executes an application, wherein said device is connected to said information processing apparatus, said method comprising the steps of obtaining a first part of data to generate a device driver for said device, and generating said device driver for said device by using said first part of data and a second part of data stored in a memory, wherein said memory stores said application and said second part of data.

According to a second aspect of the invention, there is provided an information processing apparatus for executing an application and for generating a device driver for a device connected to said apparatus, said apparatus comprising:

a processor for obtaining a first part of data to generate a device driver for said device and generating said device driver for said device by using said first part of data and a second part of data stored in a memory, wherein said memory stores said application and said second part of data.

According to another aspect of the invention, there is provided a computer program to be executed in an information processing apparatus for executing an application and for generating a device driver for a device connected to said apparatus, said computer program comprising:

code for obtaining a first part of data to generate a device driver for said device; and code for generating said device driver for said device by using said first part of data and a second part of data stored in a memory, wherein said memory stores said application and said second part of data.

According to another aspect of the invention, there is provided a method of providing forward compatibility of device driver code of an unchangeable application with a plurality of device models, wherein said application is not linked to other executable code, said method comprising the steps of:

including device model independent device driver code in said application;

determining a model of a device to which said application is desired to interface with;

reading model dependent configuration data for said model of said device; and configuring said device driver code with said model dependent configuration data.

Other aspects of the invention are also disclosed.

BRIEF DESCRIPTION OF THE DRAWINGS

One or more embodiments of the present invention will now be described with reference to the drawings, in which:

FIG. 2 shows a structure of a Printer Characterisation File (PCF);

FIG. 4 shows pseudo-code in the C programming language of a typical prior art printer driver; and FIG. 5 shows pseudo-code in the C programming language for loading the PCF and configuring the print operation from the PCF.

DETAILED DESCRIPTION INCLUDING BEST MODE

Figure 1:
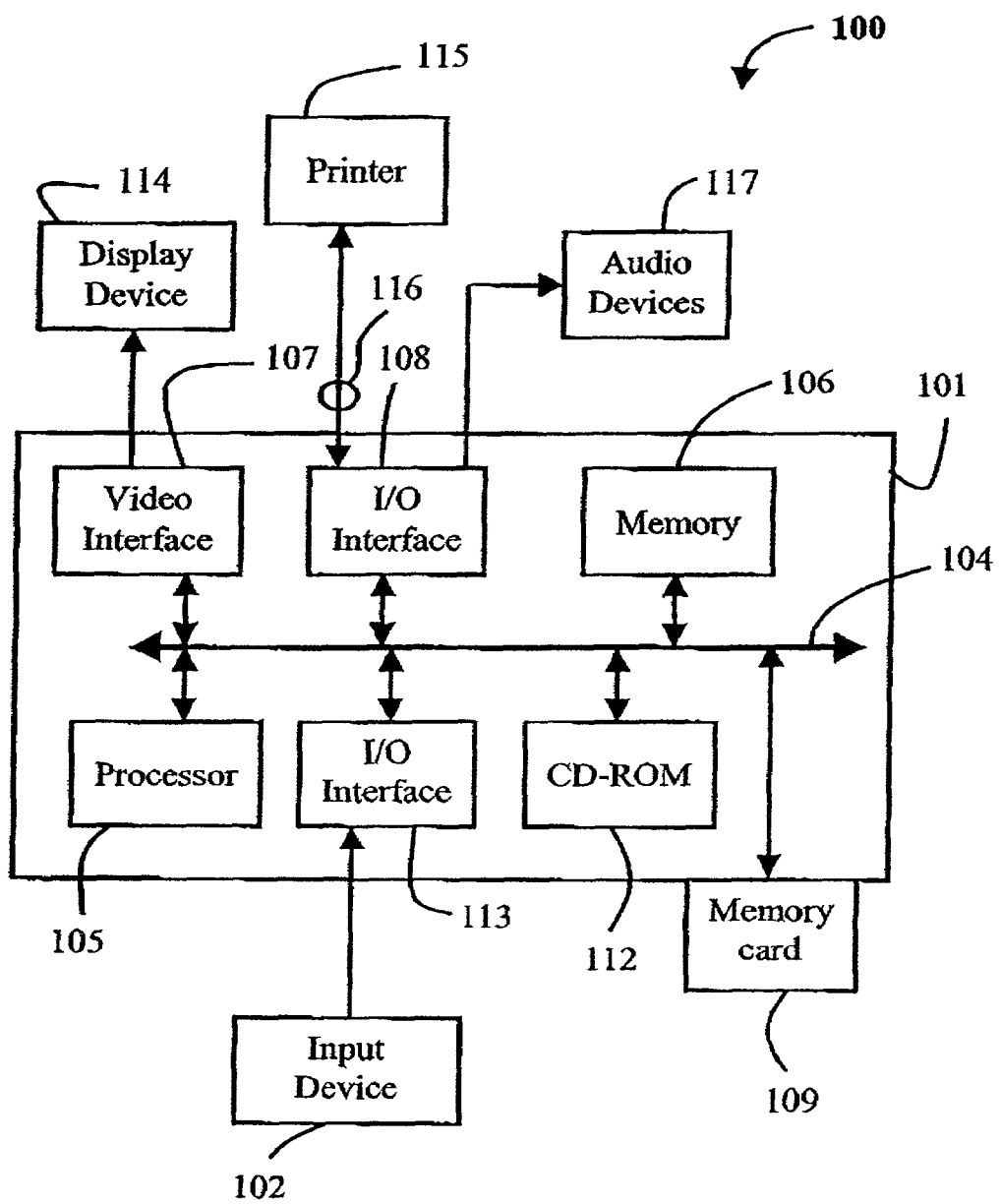
FIG. 1 is a schematic block diagram of a gaming system.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to peripheral devices attached to Computer Entertainment Systems or Set top Boxes. For ease of explanation, the steps of the preferred method are described with reference to a printer connected to a games console through a Universal Serial Bus (USB) port. However, it is not intended that the present invention be limited to the described method. For example, the invention may also have application to input devices such as a camera, and output devices such as a display device.

A schematic block diagram of a gaming system 100 is shown in FIG. 1, The gaming system 100 comprises a games console 101, input device(s) 102, such as a games controller and/or joystick, and output devices including a printer 115, speakers 117 and a display device 114.

The games console 101 typically includes at least one processor unit 105, a memory unit 106, for example formed from semiconductor random access memory (RAM) and read only memory (ROM), input/output (I/O) interfaces including a video interface 107, an I/O interface 113 for the input device(s) 102, and an I/O interface 108 for the printer 115.

A CD-ROM drive 112 is typically provided as a non-volatile source of data Alternatively, a DVD-ROM drive or a ROM cartridge slot may be provided as the nonvolatile source of data. A memory card 109 is also provided with non-volatile RAM, typically connected to the games console 101, and in particular connected directly to a interconnected bus 104. The components 105 to 113 of the games console 101, typically communicate via the interconnected bus 104 and in a manner which results in a conventional mode of operation of the gaming system 100 known to those in the relevant art.

Typically, an application program, which includes a game, is supplied to the user encoded on a CD-ROM. The CD-ROM is inserted into the CD-ROM drive 112, and read and controlled in its execution by the processor 105. Intermediate storage of the program may be accomplished using the semiconductor memory 106.

The application program is a monolithic, unchangeable application, loaded from the CD-ROM every time the application program is executed. This application program also includes a component for printing, which shall be referred to as the Device Model Independent Printer Driver (DMIPD). The DMIPD provides a printing API to the rest of the game application, and contains code that provides generic printing functionality. It contains no model specific printer code. This allows it to be device model independent.

However, for the DMIPD to successfully interchange data with the printer, it requires a mechanism to make the data compatible with specific models of printer. This includes appropriate control codes to control the printer, colour conversion, half toning, resolution and media sizes used.

Therefore, the DMIPD is logically structured into a non-changing code part and a table-driven code part. Code in the table-driven code part generates model-specific output commands. The table-driven code part thus introduces a level of independence to the code in the DMIPD.

The tables may be loaded separately, and are loaded at run time. The tables are provided in the form of a printer configuration file (PCF), which is generated for each model of printer or group of printers with the same characteristics. Key printer characteristics, such as the mapping from RGB colour-space to the printer's native colour-space, supported media types and print control commands are stored as tables of data. Each PCF contains a characterisation of its printer(s) that is detailed enough to allow the DMIPD to print to such a printer. FIG. 2 shows a proposed structure for the PCF. In a first field 301, the PCF for a specific printer model, or set of printer models, contains an array of strings that list printer model(s) that it characterises. In a second field 302, the PCF specifies the number of colour components that the printer 115 has. For example, a Cyan-Magenta-Yellow-Black printer has four colour components.

Field 303 provides a simplified example of a look-up table that converts colour information from the RGB colour space to the colour space of the printer's first colour component, for example Cyan. A number of subsequent fields 304 to 305 similarly provide colour conversion information for each of the remaining colour components of the printer 115. Colour conversion and colour reproduction are more complex than what is contained in fields 303 to 305.

As would be recognised by those skilled in the art, colour conversion and colour reproduction includes the steps of colour space conversion into a colorimetric colour space, under-colour removal, device characterisation, render intent handling and gamut mapping, followed by error diffusion or dithering. These processes are described in full in various publications of the International Color Consortium (ICC).

As colour conversion and colour reproduction can be broken up into two parts, namely a part containing tabulated data suitable for a specific printer, and a second part containing fixed algorithms that do not change from one model to the next, the data provided in fields 303 to 305 are sufficient for colour conversion and colour reproduction to be performed.

Field 306 specifies the printer controlling command sequence that is sent to the printer 115 at the start of a page, whereas field 307 specifies the printer controlling command sequence that is sent to the printer 115 at the end of the page. Field 308 specifies the printer controlling command sequence that is sent to the printer 115 at the start of a scan-line of image data of the first printer colour component. A number of subsequent fields 309 to 310 similarly provide printer controlling command sequences that are sent to the printer 115 at the start of scan-lines of image data of the remaining printer colour components.

Finally, field 311 specifies the printer controlling command sequence that is sent to the printer 115 at the end of a scan-line of image data.

At the time when an application program is placed on the CD/DVD, PCFs are included on the CD/DVD for each model of printer that is to be supported.

However, after the release of the application program, new models of printer will continue to be released. In order to provide compatibility of the application program with these new models, new PCFs are needed. These PCFs are generated for the new models of printers, and supplied to the user on a CD, along with a further application program that copies the PCFs to the memory card 109 of the gaming system 100, at a predetermined location. This predetermined location for PCFs is preferably in a directory named "PCFS" that resides in the root directory of the memory card 109.

Figure 3:
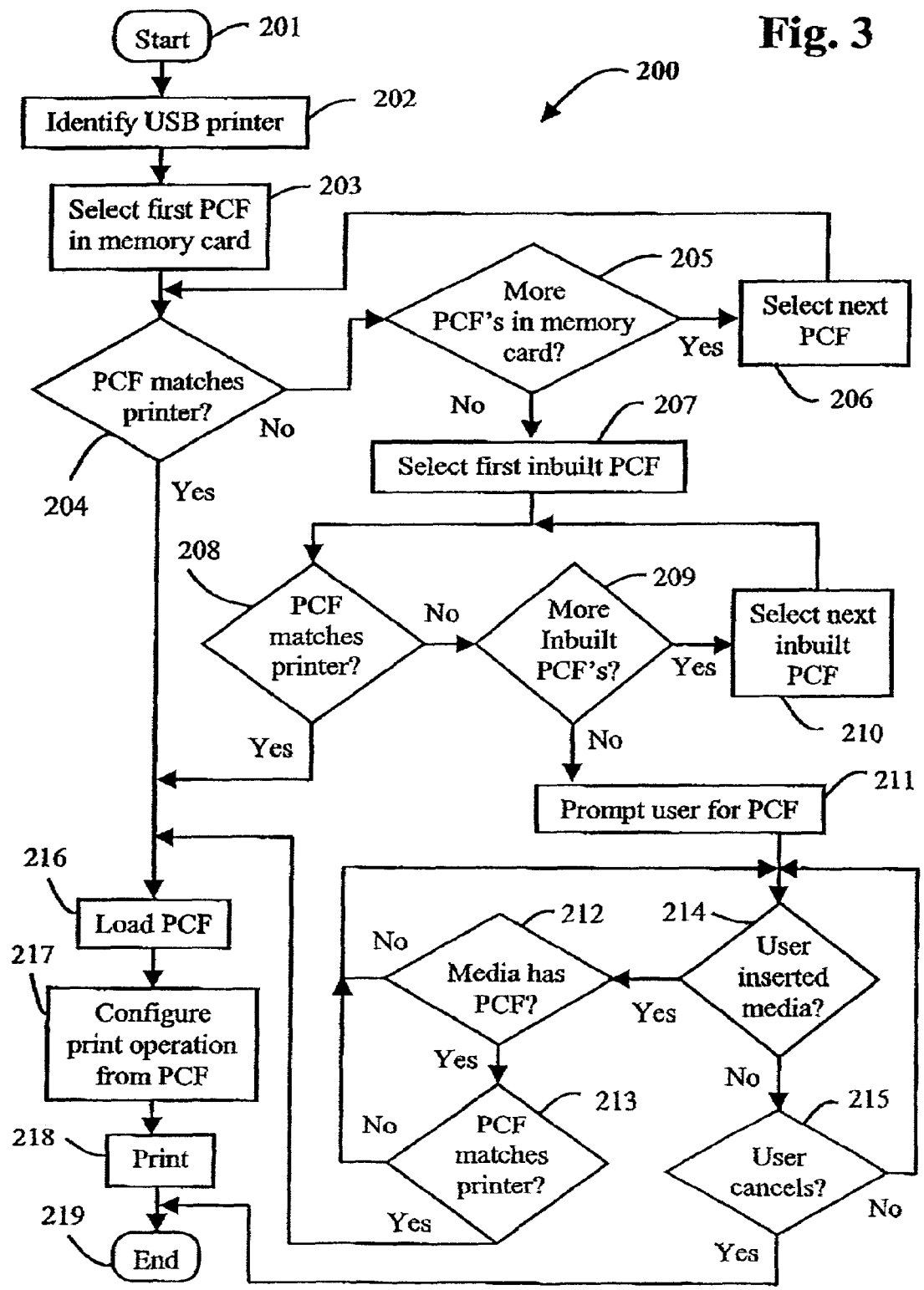
FIG. 3 is a flow diagram of the operation of the Device Model Independent Printer Driver (DMIPD)

During the execution of the application program, such as a game, printing may be initiated by the user. FIG. 3 shows a flow diagram of the operation of the DMIPD. Starting in step 201, the DMIPD is initialised by the application program.

The DMIPD determines what model of printer is connected to the console in step 202. This is done by obtaining a model name of the printer 115 plugged into the USB port 116 through the use of the USB printer class, which provides a mechanism for reading an IEEE-1284 identification string from a USB printer. This identification String specifies the printer model as a text string, in addition to other data such as manufacturer, serial number, etc.

With the model of the printer 115 known, the DMIPD attempts to obtain an S appropriate PCF for that model of printer. Accordingly, in step 203 the DMIPD selects the first PCF in the memory card 109, and determines whether this PCF matches the printer 115 that is presently connected to the gaming module 101 in step 204. Determining whether this PCF matches the printer is performed by comparing the printer identification string, which it obtained from the USB printer class, with the model strings in the first field 301 of the PCF.

If the PCF read from the memory card 109 does not match the printer 115, then the DMIPD determines in step 205 whether more PCFs are present on the memory card 109. With more PCFs available from the memory card 109, the DMIPD selects the next PCF in step 206 and returns to step 204 where it is determined whether this PCF matches the printer 115.

If an appropriate PCF is not available from the memory card 109, a point will be reached in the method 200 where step 205 determines that no more PCFs are available from the memory card 109.

The DMIPD proceeds to search for an appropriate PCF by searching amongst the inbuilt PCFs, which are located on the application program CD/DVD. In step 207 the DMIPD selects the first inbuilt PCF, and determines whether this PCF matches the printer 115 in step 208. If the inbuilt PCF does not match the printer 115, then the DMIPD determines in step 209 whether more inbuilt PCFs are present. With more inbuilt PCFs available, the DMIPD selects the next PCF in step 210 and returns to step 208 where it is determined whether this PCF matches the printer 115.

If an appropriate PCF is also not available from the inbuilt PCFs, then, from step 209, the method 200 will continue to step 211 where the user is prompted to provide an appropriate PCF. The user can do this by inserting the CD that came with the new printer 115, or by inserting another memory card 109 that contains the PCF.

In step 214, the DMIPD determines whether a new media, such as a CD or memory card has been inserted. If a new media has been inserted, then the DMIPD automatically scans any newly inserted media for the correct PCF in steps 212 and 213.

If it is determined that no new media has been inserted in step 214, then the user is provided with an option to cancel printing in step 215, in which case the method ends in step 219.

Once an appropriate PCF is found in steps 204, 208 or 213, then the PCF is loaded by the DMIPD in step 216.

In step 217 the DMIPD configures itself to use that PCF. In the preferred implementation, step 216 allocates a buffer of exactly the right size for the PCF data and then loads the PCF into it. Step 217 then assigns one or more data pointers to point to the data of the loaded PCF.

FIG. 4 shows pseudo-code in the C programming language of a typical prior art printer driver. In such a conventional printer driver, the data pointers point to fixed data. FIG. 5 shows pseudo-code in the C programming language for performing steps 216 and 217. In the DMIPD, the data pointers point to data that is loaded from the PCF With the DMIPD configured with the printer specific PCF data, the DMIPD is able to print to the printer 115 in step 218. After printing, the method ends in step 219.

Preferably, if the user supplies the PCF from the CD in step 214, then the DMIPD shall provide an option to the user to copy that PCF to one or more memory cards 109. Copying the PCF to memory card(s) will make future printing operations easier for the user, as they will not need to swap discs.

In summary, the disclosed method and apparatus provide forward compatibility of peripheral driver software with new peripheral hardware. This is achieved with no change to the executable code of the driver software, but only to non-executable configuration files. The method is highly applicable to video game console applications, because these consoles generally do not allow any changes to the executable code of their applications.

Although the PCF is read from the CD via CD-ROM drive 112 or memory card, the PCF can be read (uploaded) from a memory of a printer 115 via the USB port 116 or read (downloaded) from a memory of external apparatus such as a server on a computer network. Also a software program in accordance with the flow diagram shown in FIG. 3 may be executed by processor 105 (CPU) when a printing operation is required by a user. By executing the software program, the processor 105 uses USB Plug and Play to identify any available printer, chooses a PCF according to which printer is available and processes the PCF to generate a printer driver when a user selects a printing operation after starting the game application. For example, when the user selected a printing switch, an obtaining operation comprising steps 203 to 216 of the flow diagram of FIG. 3 may be executed by the processor 105.

The foregoing describes only one implementation of the present invention, and modifications and/or changes can be made thereto without departing from the scope and spirit of the invention, the implementation being illustrative and not restrictive.

We claim:

1. A computer implemented method for generating a device driver for an output device by an information processing apparatus, wherein said output device is connected to said information processing apparatus, said method comprising the steps of:

loading an application from a read-only memory, said application including a device model independent device driver;

determining a model of said output device to which said application is intending to issue output commands;

determining whether a device model dependent configuration data in a memory device matches said model of said output device, said memory device being a memory card connected to said information processing apparatus;

upon determining that said device model dependent configuration data in said memory device matches said model of said output device, reading said device model dependent configuration data from said memory device; and generating said device driver for said output device by configuring said device model independent device driver with said device model dependent configuration data.

2. A method according to claim 1, wherein said device model dependent configuration data is color conversion data to convert RGB color-space to a native color-space of said output device.

3. A method according to claim 1, wherein said application in said read-only memory is an unchangeable application.

4. A method according to claim 1, wherein said information processing apparatus is a game console.

5. A method according to claim 1, wherein said application is a game application executed on a game console.

6. A method according to claim 1, wherein said model of said output device is determined through reading an identification string from said output device.

7. A method according to claim 1, wherein, upon determining that said device model dependent configuration data in said memory device does not match said model of said output device, said determining step further determines whether further configuration data in a further memory device matches said model of said output device, and upon determining that said further configuration data in said further memory device matches said model of said output device, loading said further configuration data from said further memory device as said device model dependent configuration data.

8. A method according to claim 1, wherein said read-only memory is an optical storage disc for a game.

9. A method according to claim 1, wherein said device is connected to said information processing apparatus by means of a USB connection.

10. A method according to claim 1, wherein said output device is a printer, and said reading step is executed in the information processing apparatus when said application is controlled to perform a printing operation.

11. An information processing apparatus for executing an application and for generating a device driver for an output device connected to said information processing apparatus, said information processing apparatus comprising:

a read-only memory for storing an application, said application including a device model independent device driver;

a memory device for storing device model dependent configuration data, said memory device being a memory card connected to said information processing apparatus; and a processor for determining a model of said output device to which said application intends to issue output commands, determining whether said device model dependent configuration data matches said model of said output device, upon determining that said device model dependent configuration data in said memory device matches said model of said output device, reading said device model dependent configuration data from said memory device and generating said device driver for said device by configuring said device model independent device driver with said device model dependent configuration data.

12. A computer program to be executed in an information processing apparatus for executing an application and for generating a device driver for an output device connected to said information processing apparatus, said computer program being stored on a read-only memory and comprising:
   a device model independent device driver;
   code for determining a model of an output device to which said application intends to issue output commands;
   code for determining whether device model dependent configuration data in a memory device matches said model of said output device, said memory device being a memory card connected to said information processing apparatus;
   upon determining that said device model dependent configuration data in said memory device matches said model, code for reading said device model dependent configuration data from said memory device; and
   code for generating said device driver for said output device by configuring said device model independent device driver with said device model dependent configuration data.

13. A method of providing forward compatibility of device driver code of an unchangeable application with a plurality of device models, wherein said application is stored in a read-only memory and not linked to other executable code, said method comprising the steps of:
   including device model independent device driver code in said application; determining a model of an output device which said application is desired to issue commands to;
   determining whether a device model dependent configuration data in a memory card matches said model of said output device;
   upon determining that said device model dependent configuration data in the memory card matches said model of said output device, reading the model dependent configuration data for said model of said output device from the memory card; and
   generating a device driver for said model of said output device by configuring said device model independent device driver code with said model dependent configuration data.

14. A method according to claim 13, wherein said model of said device is determined through reading an identification string from said device.

15. A method according to claim 13 or 14, wherein said unchangeable application is a game application executed on a game console.

16. An information processing apparatus for providing forward compatibility of device driver code of an unchangeable application with a plurality of device models, wherein said application is stored in a read-only memory and not linked to other executable code and said device driver code is device model independent, said apparatus comprising:
   a memory card for storing model dependent configuration data for a plurality of devices;
   means for determining a model of an output device which said application is desired to issue commands to;
   means for determining whether said device model dependent configuration data in said memory card matches said model of said output device;
   data reading means for reading model dependent configuration data associated with said model of said output device from said memory card upon determining that said device model dependent configuration data in said memory card matches said model of said output device; and
   means for generating a device driver for said model of said output device by configuring said device model independent device driver code with said model dependent configuration data.

17. Apparatus according to claim 16, wherein said output device is connected to said apparatus by means of a USB connection.

18. Apparatus according to claim 16 or 17, wherein said model of said output device is determined through reading an identification string from said output device.

19. Apparatus according to any one of claims 16 to 18, wherein said unchangeable application is a game application and said apparatus is a game console.

20. A computer program product, carried on a read-only storage medium, for providing forward compatibility with a plurality of device models, wherein said computer program product is not linked to other executable code, said computer program product comprising:
   an application including a device model independent device driver code;
   code for determining a model of an output device which said application is desired to issue commands to;
   code for determining whether a device model dependent configuration data in a memory card matches said model of said output device:
   code for reading said device model dependent configuration data associated with said model of said output device from said memory card upon determining that said device model dependent configuration data in said memory card matches said model of said output device; and
   code for generating a device driver for said model of said output device by configuring said device model independent device driver code with said model dependent configuration data.

* * * * *

UNITED STATES PATENT AND TRADEMARK OFFICE
CERTIFICATE OF CORRECTION

PATENT NO. : 7,178,151 B2  
APPLICATION NO. : 09/988446  
DATED : February 13, 2007  
INVENTOR(S) : Ecob et al.

Page 1 of 1

It is certified that error appears in the above-identified patent and that said Letters Patent is hereby corrected as shown below:

COLUMN 1:  
Line 47, "Postscript®" should read -- PostScript® --.

COLUMN 4:  
Line 32, "FIG.1," should read -- FIG.1. --;  
Line 44, "data Alternatively," should read -- data. Alternatively, --;  
Line 45, "nonvolatile" should read -- non-volatile --; and  
Line 48, "a" should read -- an --.

COLUMN 6:  
Line 21, "String" should read -- string --; and  
Line 26, "S" should be deleted.

COLUMN 9:  
"determining" should read -- ¶ determining --.

Signed and Sealed this

Eighteenth Day of March, 2008

JON W. DUDAS  
*Director of the United States Patent and Trademark Office*